United States Patent
Katusic et al.

(10) Patent No.: US 8,545,788 B2
(45) Date of Patent: Oct. 1, 2013

(54) LOW-SURFACE AREA FUMED SILICON DIOXIDE POWDER

(75) Inventors: Stipan Katusic, Bad Soden (DE); Guido Zimmermann, Bruehl (DE); Horst Miess, Kahl (DE); Witold Katerinak, Wehr (DE); Martin Moerters, Mobile, AL (US)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 13/133,316

(22) PCT Filed: Nov. 9, 2009

(86) PCT No.: PCT/EP2009/064819
§ 371 (c)(1),
(2), (4) Date: Jun. 7, 2011

(87) PCT Pub. No.: WO2010/069675
PCT Pub. Date: Jun. 24, 2010

(65) Prior Publication Data
US 2011/0244387 A1    Oct. 6, 2011

(30) Foreign Application Priority Data
Dec. 20, 2008 (DE) .......... 10 2008 064 284

(51) Int. Cl.
- *C01B 33/12* (2006.01)
- *C01B 33/02* (2006.01)
- *B01J 23/02* (2006.01)
- *C03C 27/00* (2006.01)

(52) U.S. Cl.
USPC ........... 423/335; 423/348; 423/337; 502/439; 428/630

(58) Field of Classification Search
None
See application file for complete search history.

(56) References Cited

U.S. PATENT DOCUMENTS

| | | | |
|---|---|---|---|
| 2003/0037568 A1* | 2/2003 | Fujiwara et al. | 65/17.4 |
| 2003/0138715 A1* | 7/2003 | Barthel et al. | 430/108.3 |
| 2004/0131527 A1 | 7/2004 | Gottschalk-Gaudig et al. | |
| 2004/0156773 A1* | 8/2004 | Kutsovsky | 423/337 |
| 2006/0201647 A1 | 9/2006 | Schumacher et al. | |
| 2006/0269465 A1 | 11/2006 | Mitani et al. | |
| 2007/0175362 A1* | 8/2007 | Gutsch et al. | 106/401 |
| 2008/0213591 A1* | 9/2008 | Meyer et al. | 428/402 |

FOREIGN PATENT DOCUMENTS

| | | |
|---|---|---|
| CN | 1405084 A | 3/2003 |
| CN | 1816494 A | 8/2006 |
| JP | 2002114510 * | 4/2002 |

OTHER PUBLICATIONS

International Search Report issued Mar. 14, 2011 in PCT/EP09/64819 filed Nov. 9, 2009.

Search Report issued Feb. 22, 2013 in CN Patent Application No. 200980151182.X (English translation).

* cited by examiner

*Primary Examiner* — Bijay Saha
(74) *Attorney, Agent, or Firm* — Oblon, Spivak, McClelland, Maier & Neustadt, L.L.P.

(57) ABSTRACT

Fumed silicon dioxide powder with a BET surface area of 20 to 35 $m^2/g$, characterized in that a) the number-based median particle diameter is 60 to 150 nm, and b) the proportion of particles with a diameter of 200 nm or more is at most 10%, and c) the proportion of particles with a diameter of up to 60 nm is at most 20%, based in each case on the total number of particles.

2 Claims, No Drawings

LOW-SURFACE AREA FUMED SILICON DIOXIDE POWDER

The invention relates to a low-surface area fumed silicon dioxide powder, and to the preparation and use thereof.

The invention further relates to a surface-modified silicon dioxide powder obtainable therefrom, and to the preparation and use thereof.

Fumed silicon dioxide powders are notable for their high purity. The particles generally have no internal surface area and have reactive groups on their surface. Fumed silicon dioxide can be prepared by flame hydrolysis, flame oxidation, or in a process in which these reaction types proceed alongside one another. In this process, an evaporated or gaseous hydrolyzable silicon halide is mixed with a flame which has been formed by burning a water-forming fuel and an oxygenous gas. The combustion flame provides water for the hydrolysis of the silicon halide and sufficient heat for the hydrolysis reaction. In the flame oxidation, instead of the hydrolysis, carbon-containing starting materials are oxidized.

The powders thus obtained can be surface modified in a subsequent step.

A problem is the preparation of fumed silicon dioxide powders with low BET surface area.

EP-A-1361195 discloses a fumed silicon dioxide powder with a BET surface area of 30 m$^2$/g and a median particle diameter $d_{50}$ of 195 nm, where the distribution of the particle diameters, expressed by the $(d_{10}-d_{90})/2d_{50}$ ratio, is 34.4.

The fumed silicon dioxide powder is obtained by hydrolyzing an evaporated starting compound of the silicon dioxide, for example silicon tetrachloride, in a flame. This is achieved by setting a flame temperature above the melting point of silicon dioxide.

DE-A-10139320 discloses a powder of spherical silicon dioxide particles with a BET surface area of 25 m$^2$/g, which has a particle distribution of 50 nm to 1 μm. It is obtained by atomizing hexamethyldisiloxane into an auxiliary flame of a combustion gas and oxygen. An essential feature in the performance of the reaction is a high siloxane content in the reaction mixture. Accordingly, only small amounts of combustion gas and only a low stoichiometric excess of oxygen are used. Higher proportions lead to aggregated silicon dioxide particles with high BET surface area.

The silicon dioxide powders disclosed in EP-A-1361195 and DE-A-10139320 exhibit large median particle diameters and a broad distribution of the particle diameters. This limits the possible uses of the powders. EP-A-1361195 addresses a narrow distribution of the particle diameters. However, the object remains of providing powders of fumed silicon dioxide particles with small median particle diameters and a narrow distribution of the particle diameters compared to the prior art.

Moreover, the wide distribution of the particle sizes in the prior art indicates an unstable process regime. It is therefore a further object of the invention to provide a process for preparing a fumed, low-surface area silicon dioxide powder, which can be operated stably.

It was a further object of the invention to provide a powder of surface-modified fumed silicon dioxide particles, and a process for preparation thereof.

The invention provides a fumed silicon dioxide powder with a BET surface area of 20 to 35 m$^2$/g, preferably of 23 to 28 m$^2$/g, in which
a) the number-based median particle diameter is 60 to 150 nm, preferably 80 to 130 nm, and
b) the proportion of particles with a diameter of 200 nm or more is at most 10%, and
c) the proportion of particles with a diameter of up to 60 nm is at most 20%, based in each case on the total number of particles.

The BET surface area is determined based on DIN 66131. The number-based median particle diameter, the proportion of particles with a diameter of 200 nm and the proportion of particles with a diameter of up to 60 nm are obtained by counting the particles from TEM images (TEM=Transmission Electron Microscopy).

The inventive silicon dioxide powder is X-ray-amorphous. The proportion of chloride is not more than 100 ppm, generally less than 50 ppm.

The particles are predominantly isolated spherical individual particles, and aggregated non-spherical particles consisting of up to three particles joined to one another. At least some of the particles of the inventive silicon dioxide powder are aggregated non-spherical particles. In general, the proportion of non-spherical aggregated particles is 0.5 to 10% by weight, based on the powder. Non-spherical particles can offer advantages in use, when the object is to use a substrate to form a maximum common surface area.

In a particular embodiment of the invention, the proportion of particles with a diameter of 200 nm or more is 0 to 5%, based on the total number of particles.

In a further particular embodiment of the invention, the proportion of particles with a diameter of up to 60 nm is 0 to 10%, based on the total number of particles.

An advantageous embodiment may be one in which
a) the BET surface area is from 23 to 28 m$^2$/g,
b) the number-based median particle diameter is 100±20 nm,
c) the proportion of particles with a diameter of 200 nm or more is 0 to 5%,
d) the proportion of particles with a diameter of up to 60 nm is at most 0 to 10%, based in each case on the total number of particles, and
e) the proportion of non-spherical aggregated particles is 0.5 to 10% by weight, based on the powder.

The invention further provides a process for preparing a silicon dioxide powder with a BET surface area of 10 to 40 m$^2$/g, preferably 20 to 35 m$^2$/g, more preferably 23 to 28 m$^2$/g, in which
a) an aerosol obtained by atomizing at least one liquid siloxane is introduced with an oxygen-containing gas into a flame obtainable by igniting a hydrogenous combustion gas and an oxygen-containing gas, preferably oxygen-enriched air, with an oxygen content of 25 to 35% by volume, said siloxane being selected from the group consisting of the linear siloxanes of the general formula $(R^1)_3SiO[SiR^2R^3O]_mSi(R^1)_3$ and
the cyclic siloxanes of the general formula $[SiR^1R^2O]_n$, where $R^1$, $R^2$, $R^3$=Me or Et, m=1 to 20, n=3 to 7,
where $R^1$, $R^2$, $R^3$, m and n are independent of one another, and where
b) at the time of injection into the flame,
  b1) the molar ratio of oxygen used/oxygen required for complete oxidation of the siloxane is 1.1 to 2.5, preferably 1.5 to 2,
  b2) the molar oxygen/hydrogenous combustion gas ratio is 0.5 to 1, preferably 0.7 to 0.9, and
  b3) the ratio of oxygen used/oxygen required for oxidation of the siloxane and of the combustion gas is 0.80 to 0.99, preferably 0.85 to 0.95,
c) air is additionally introduced along the flame, where the quantitative ratio of air to the oxygen-enriched air used to generate the flame is 0.9 to 1.40, preferably 0.95 to 1.2, d) then water is added to the reaction mixture for cooling, where the amount of water is 0.1 to 1.5 kg/m$^3$ (STP) of process gas, preferably 0.6 to 1 kg/m$^3$ (STP) of process gas, and e) the solid is removed.

One essential feature of the process according to the invention is that, as stated in feature b3), the ratio of oxygen used/oxygen required for oxidation of the siloxane and of the combustion gas is 0.80 to 0.99, i.e. substoichiometric, while the conditions specified in b1) and b2) are met.

A further essential feature is the rapid cooling of the process stream with water in order to prevent undesired, uncontrolled coalescence of particles.

Siloxanes used with preference are hexamethyldisiloxane, octamethyltrisiloxane, octamethylcyclotetrasiloxane (D4) and decamethylcyclopentasiloxane (D5), and mixtures thereof. More preferably, octamethylcyclotetrasiloxane (D4) can be used.

The oxygen-containing gas used for atomization may be air, oxygen or oxygen-enriched air. In general, air is used.

The droplets formed in atomization should not be larger than 100 μm, more preferably smaller than 50 μm. According to the structure of the siloxane, the preferred droplet size can be achieved by the change in the viscosity.

The atomization pressure with which the aerosol is introduced into the flame is preferably 1 to 3 bar gauge.

The hydrogen-containing combustion gas according to the invention is preferably hydrogen, methane, ethane, propane and mixtures thereof. More preferably, hydrogen can be used.

"Process gas" is understood to mean the sum of the gaseous unconverted feedstocks and of the gaseous products including oxygen, nitrogen, water vapour and carbon dioxide.

The invention further provides a surface-modified fumed silicon dioxide powder with a BET surface area of 10 to 30 m$^2$/g, obtainable by reacting the fumed silicon dioxide powder with one or more surface modifiers. The carbon content may be in the range from 0.1 to 5% by weight, preferably 0.3 to 2% by weight, based in each case on the powder.

The surface modifiers used may, for example, be silanes, individually or as a mixture. Examples include:

Organosilanes $(RO)_3Si(C_nH_{2n+1})$ and $(RO)_3Si(C_mH_{2m-1})$
where R=alkyl, such as methyl, ethyl, n-propyl, i-propyl, butyl, n=1-20, m=2-20.

Organosilanes $(R^1)_x(RO)_ySi(C_nH_{2n+1})$ and $(R^1)_x(RO)_ySi(C_mH_{2m-1})$
where R=alkyl, such as methyl, ethyl, n-propyl, i-propyl, butyl; R$_1$=alkyl, such as methyl, ethyl, n-propyl, i-propyl, butyl, cycloalkyl; n=1-20; m=2-20; x+y=3, x=1, 2; y=1, 2.

Haloorganosilanes $X_3Si(C_nH_{2n+1})$ and $X_3Si(C_mH_{2m-1})$
where X=Cl, Br; n=1-20; m=1-20.

Haloorganosilanes $X_2(R)Si(C_nH_{2n+1})$ and $X_2(R)Si(C_mH_{2m-1})$
where X=Cl, Br; R=alkyl, such as methyl, ethyl, n-propyl, i-propyl, butyl, cycloalkyl; n=1-20; m=2-20.

Haloorganosilanes $X(R)_2Si(C_nH_{2n+1})$ and $X(R)_2Si(C_mH_{2m-1})$
where X=Cl, Br; R=alkyl, such as methyl, ethyl, n-propyl, i-propyl, butyl, cycloalkyl; n=1-20; m=2-20.

Organosilanes $(RO)_3Si(CH_2)_m$—R$^1$
where R=alkyl, such as methyl, ethyl, propyl; m=0.1-20; R$^1$=methyl, aryl such as —C$_6$H$_5$, substituted phenyl radicals, C$_4$F$_9$, OCF$_2$—CHF—CF$_3$, C$_6$F$_{13}$, OCF$_2$CHF$_2$, S$_x$—(CH$_2$)$_3$Si(OR)$_3$.

Organosilanes $(R_2)_x(RO)_ySi(CH_2)_m$—R$^1$
where R$^1$=methyl, aryl, such as C$_6$H$_5$, substituted phenyl radicals, C$_4$F$_9$, OCF$_2$—CHF—CF$_3$, C$_6$F$_{13}$, OCF$_2$CHF$_2$, S$_x$—(CH$_2$)$_3$Si(OR)$_3$, SH, NR$^3$R$^4$R$^5$ with R$_3$=alkyl, aryl; R$_4$=H, alkyl, aryl; R$_5$=H, alkyl, aryl, benzyl, C$_2$H$_4$NR$^6$R$^2$ with R$^6$=H, alkyl and R$^2$=H, alkyl; R$_2$=alkyl; x+y=3; x=1, 2; y=1, 2; m=0.1 to 20.

Haloorganosilanes X$_3$Si(CH$_2$)$_m$—R
where X=Cl, Br; R=methyl, aryl such as C$_6$H$_5$, substituted phenyl radicals, C$_4$F$_9$, OCF$_2$—CHF—CF$_3$, C$_6$F$_{13}$, O—CF$_2$—CHF$_2$, S$_x$—(CH$_2$)$_3$Si(OR$^1$)$_3$, where R$^1$=methyl, ethyl, propyl, butyl and x=1 or 2, SH; m=0.1-20.

Haloorganosilanes R$^1$X$_2$Si(CH$_2$)$_m$R$^2$
where X=Cl, Br; R$^1$=alkyl, such as methyl, ethyl, propyl, R$^2$=methyl, aryl such as C$_6$H$_5$, substituted phenyl radicals, C$_4$F$_9$, OCF$_2$—CHF—CF$_3$, C$_6$F$_{13}$, O—CF$_2$—CHF$_2$, —OOC(CH$_3$)C═CH$_2$, —S$_x$—(CH$_2$)$_3$Si(OR$^2$)$_3$, where R$^3$=methyl, ethyl, propyl, butyl and x=1 or 2, m=0.1-20.

Haloorganosilanes R$^1_2$XSi(CH$_2$)$_m$R$^2$
with X=Cl, Br; R$^1$=alkyl, such as methyl, ethyl, propyl, R$^2$=methyl, aryl such as C$_6$H$_5$, substituted phenyl radicals, C$_4$F$_9$, OCF$_2$—CHF—CF$_3$, C$_6$F$_{13}$, O—CF$_2$—CHF$_2$, —S$_x$—(CH$_2$)$_3$Si(OR$^3$)$_3$, where R$^3$=methyl, ethyl, propyl, butyl and x=1 or 2, SH; m=0.1-20.

Silazanes R$^2$R$^1_2$SiNHSiR$^1_2$R$^2$ where R$^1$, R$^2$=alkyl, vinyl, aryl.

Cyclic polysiloxanes D3, D4, D5 and homologues thereof, where D3, D4 and D5 are understood to mean cyclic polysiloxanes having 3, 4 or 5 units of the —O—Si(CH$_3$)$_2$ type, e.g. octamethylcyclotetrasiloxane=D4.

Polysiloxanes or silicone oils of the Y—O—[(R$^1$R$^2$SiO)$_m$(R$^3$R$^4$SiO)$_n$]$_u$—Y type, where
R$^1$, R$^2$, R$^3$, R$^4$=each independently alkyl such as C$_n$H$_{2n+1}$, n=1-20; aryl, such as phenyl radicals and substituted phenyl radicals, (CH$_2$)$_n$—NH$_2$, H
Y═CH$_3$, H, C$_n$H$_{2n+1}$, n=2-20; Si (CH$_3$)$_3$, Si(CH$_3$)$_2$H, Si(CH$_3$)$_2$OH, Si(CH$_3$)$_2$(OCH$_3$), Si(CH$_3$)$_2$(C$_n$H$_{2n+1}$), n=2-20
m=0, 1, 2, 3, . . . ∞, preferably 0, 1, 2, 3, . . . 100 000,
n=0, 1, 2, 3, . . . ∞, preferably 0, 1, 2, 3, . . . 100 000,
u=0, 1, 2, 3, . . . ∞, preferably 0, 1, 2, 3, . . . 100 000.

Specific mention should be made of trimethylchlorosilane, dimethyldichlorosilane, methyltrichlorosilane, trimethylalkoxysilane, dimethylalkoxysilane, methyltrialkoxysilane, hexamethyldisilazane, decyltrimethoxysilane or polydimethylsiloxane.

The surface-modified fumed silicon dioxide powder with a BET surface area of 10 to 30 m$^2$/g can be obtained by spraying the inventive fumed silicon dioxide powder with a surface modifier and then subjecting the mixture to a one-stage or multistage thermal treatment. The thermal treatment can be effected at 20 to 400° C. over a period of 0.1 to 6 h. Alternatively, the inventive fumed silicon dioxide powder can be treated with a surface modifier in vapour form, and the mixture can then be treated thermally at a temperature of 50 to 800° C. over a period of 0.1 to 6 h.

The invention further provides for the use of the fumed silicon dioxide powder as a filler in rubber, silicone rubber and plastics, for producing dispersions, for polishing surfaces, for adjusting the rheology in paints and coatings, as a support for catalysts and as an antiblocking agent, especially for PET films, and as a constituent of toner compositions.

EXAMPLES

Example 1

The aerosol formed from the atomization of 10 kg/h (0.0337 kmol/h) of octamethylcyclotetrasiloxane (D4) with 12 m$^3$ (STP)/h of air is introduced with a pressure of 1.2 bar gauge into a flame formed by igniting a mixture of 60 m$^3$ (STP)/h of oxygen-enriched air (O$_2$ content 32% by volume) and 27 m$^3$ (STP)/h (1.205 kmol/h) of hydrogen. The oxygen component from the atomization air and the oxygen introduced to form the flame is 21.72 m$^3$ (STP)/h (0.969 kmol/h). In addition, 60 m$^3$ (STP)/h of an air stream which surrounds the flame are introduced, and the process mixture is subsequently cooled with 0.4 kg/m$^3$ (STP) of process gas.

The product deposited at a filter has a BET surface area of 25 m²/g and a median particle diameter of 84 nm, 2% of the particles having a particle diameter of more than 200 nm and 9% of the particles a particle diameter of less than 60 nm. The proportion of the non-spherical aggregated particles is approx. 4%.

V, as the molar ratio of $O_2$ used/$O_2$ required for complete oxidation of the siloxane, is 1.796. X, as the molar $O_2/H_2$ ratio, is 0.804. Y, as the ratio of $O_2$ used/$O_2$ required for oxidation of siloxane and combustion gas, is 0.946. Z, as the quantitative ratio of air/oxygen-enriched air used to generate the flame, is 1.

Examples 2 to 6 are performed analogously. Feedstocks and amounts used are reproduced in the table. The table also reproduces the properties of the powders obtained.

In Example 2, a higher proportion of oxygen is used compared to Example 1.

In Example 3, hexamethyldisiloxane (HMDSO) is used in place of D4.

In Example 4, a higher proportion of HMDSO and a lower proportion of oxygen are used compared to Example 3.

Examples 5 and 6 are comparative examples. In Example 5, X is 0.621. In Example 6, V is 2.698.

In Examples 1 to 4, inventive powders are obtained. In Examples 5 and 6, powders for which at least one parameter is outside the range claimed are obtained.

Example 7

Surface Modification of the Powder from Example 1 with Hexamethyldisilazane

In a mixer, 100 parts by weight of the silicon dioxide powder from Example 1, with intensive mixing, are sprayed first with 1 part by weight of water and then with 7.5 parts by weight of hexamethyldisilazane. Once the spraying has ended, mixing is continued for another 15 min and is followed by heat treatment at 200° C. for 30 min.

The surface-modified silicon dioxide powder has a BET surface area of 19 m²/g and a carbon content of 0.29% by weight.

Example 8

Surface Modification of the Powder from Example 2 with Polydimethylsiloxane

In a mixer, 100 parts by weight of the silicon dioxide powder from Example 1, with intensive mixing, are sprayed with 5 parts by weight of polydimethylsiloxane. Once the spraying has ended, mixing is continued for another 15 min and is followed by heat treatment at 300° C. for 20 min.

The surface-modified silicon dioxide powder has a BET surface area of 15 m²/g and a carbon content of 1.40% by weight.

TABLE 1

Feedstocks and amounts used; powder properties

| | | Example 1 | Example 2 | Example 3 | Example 4 | Example 5[a] | Example 6[a] |
|---|---|---|---|---|---|---|---|
| Siloxane | | D4 | D4 | HMDSO | HMDSO | D4 | D4 |
| | kg/h | 10 | 10 | 6 | 7 | 15 | 8 |
| | kmol/h | 0.0337 | 0.0337 | 0.0370 | 0.0431 | 0.0506 | 0.0270 |
| Atomization air | m³ (STP)/h | 12 | 7 | 12 | 12 | 7 | 10 |
| Pressure | bar g | 1.2 | 1.9 | 1.2 | 1.2 | 1.2 | 1.2 |
| Air | m³ (STP)/h | 60 | 60 | 60 | 55 | 45 | 75 |
| $O_2$ content | Vol. % | 32 | 35 | 32 | 32 | 34 | 32 |
| Total $O_2$ | m³ (STP)/h | 21.72 | 22.47 | 21.72 | 20.12 | 16.77 | 26.1 |
| | kmol/h | 0.969 | 1.002 | 0.969 | 0.898 | 0.748 | 1.164 |
| Combustion gas $H_2$ | m³ (STP)/h | 27 | 27 | 25 | 25 | 27 | 27 |
| | kmol/h | 1.205 | 1.205 | 1.115 | 1.115 | 1.205 | 1.205 |
| Air | m³ (STP)/h | 60 | 60 | 70 | 60 | 60 | 60 |
| Water | kg/m³ (STP) | 0.4 | 0.4 | 0.3 | 0.3 | 0.6 | 0.3 |
| Calculated | $V^{1)}$ | 1.796 | 1.858 | 2.185 | 1.735 | 0.925 | 2.698 |
| | $X^{2)}$ | 0.804 | 0.832 | 0.869 | 0.805 | 0.621 | 0.967 |
| | $Y^{3)}$ | 0.946 | 0.963 | 0.901 | 0.788 | 0.632 | 1.149 |
| | $Z^{4)}$ | 1 | 1 | 1.17 | 1.09 | 1.33 | 0.80 |
| Powder properties | | | | | | | |
| BET surface area | m²/g | 25 | 22 | 33 | 28 | 16 | 41 |
| Median | nm | 84 | 108 | 64 | 72 | 131 | 48 |
| >200 nm | % | 2 | 3.5 | 1.5 | 2 | 5 | 2 |
| <60 nm | % | 9 | 8 | 8 | 7 | 11 | 10 |
| Non-spherical | % | approx. 6 | 8 | 4 | 5 | 8 | 8 |

[a]Comparative example;
[1]V = molar ratio of $O_2$ used/$O_2$ required for complete oxidation of the siloxane;
[2]X = molar $O_2/H_2$ ratio;
[3]Y = ratio of $O_2$ used/$O_2$ required for oxidation of siloxane and combustion gas;
[4]Z = quantitative ratio of air/oxygen-enriched air used to generate the flame

The invention claimed is:

1. A process for preparing a silicon dioxide powder having a BET surface area of 20 to 35 m$^2$/g, wherein
   a) a number-based median particle diameter is 60 to 150 nm,
   b) a proportion of particles with a diameter of 200 nm or more is at most 10%, and
   c) a proportion of particles with a diameter of up to 60 nm is at most 20%,
   based in each case on a total number of particles and
   d) comprises 0.1 to 10% by weight, based on the powder, of at least one non-spherical aggregated particle, the process comprising
   a) introducing an aerosol obtained by atomizing at least one liquid siloxane with an oxygen-comprising gas into a flame obtained by igniting a hydrogenous combustion gas and an oxygen-comprising gas with an oxygen content of 25 to 35% by volume, in a reaction mixture, said siloxane being at least one selected from the group consisting of a linear siloxane of formula (I)

$(R^1)_3SiO[SiR^2R^3O]_mSi(R^1)_3$     (I)

and a cyclic siloxane of formula (II)

$[SiR^1R^2O]_n$     (II), wherein R$^1$, R$^2$, and R$^3$ are independently methyl or ethyl, m is 1 to 20, n is 3 to 7, and R$^1$, R$^2$, R$^3$, m and n are independent of one another, and wherein
   b) at a time of injection into the flame,
      b1) a molar ratio of oxygen employed/oxygen required for complete oxidation of the siloxane is 1.1 to 2.5,
      b2) a molar oxygen/hydrogenous combustion gas ratio is 0.5 to 1, and
      b3) a ratio of oxygen employed/oxygen required for oxidation of the siloxane and of the combustion gas is 0.80 to 0.99,
   c) additionally introducing air along the flame, wherein a quantitative ratio of air to oxygen-enriched air employed to generate the flame is 0.9 to 1.40,
   d) then adding water to the reaction mixture for cooling, wherein an amount of water is 0.1 to 1.5 kg/m$^3$ (STP) of process gas, and
   e) removing a solid obtained in d).

2. The process of claim 1, wherein an atomization pressure with which the aerosol is introduced into the flame is 1 to 3 bar.

* * * * *